United States Patent
Saeki

(10) Patent No.: US 10,124,834 B2
(45) Date of Patent: Nov. 13, 2018

(54) VEHICLE LOWER PORTION STRUCTURE

(71) Applicant: TOYOTA JIDOSHA KABUSHIKI KAISHA, Toyota-shi (JP)

(72) Inventor: Koji Saeki, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 320 days.

(21) Appl. No.: 15/235,875

(22) Filed: Aug. 12, 2016

(65) Prior Publication Data

US 2017/0057549 A1     Mar. 2, 2017

(30) Foreign Application Priority Data

Aug. 25, 2015   (JP) .................. 2015-165677

(51) Int. Cl.
  *B62D 25/20*          (2006.01)
(52) U.S. Cl.
  CPC ................. *B62D 25/2036* (2013.01)
(58) Field of Classification Search
  CPC ................. B62D 25/2036; B62D 21/155
  USPC ................................... 296/193.07
  See application file for complete search history.

(56) References Cited

U.S. PATENT DOCUMENTS

| 8,226,156 | B2 * | 7/2012 | Shiono | B60N 2/4235 |
| | | | | 296/193.02 |
| 9,896,131 | B2 * | 2/2018 | Onishi | B62D 21/157 |
| 2016/0039467 | A1 * | 2/2016 | Takenaka | B62D 21/15 |
| | | | | 296/187.08 |
| 2016/0068196 | A1 | 3/2016 | Saeki | |

FOREIGN PATENT DOCUMENTS

| JP | 2-98079 U | 8/1990 |
| JP | 2000-280937 A | 10/2000 |
| JP | 2003-146251 | 5/2003 |
| JP | 2003-205870 A | 7/2003 |
| JP | 2007-269052 | 10/2007 |
| JP | 2013-154731 A | 8/2013 |
| JP | 2016-52863 | 4/2016 |

OTHER PUBLICATIONS

"Detailed Image of Eighth Generation of Volckswagen's Passat is Leaked" http://blog.livedoor.jp/ganbaremmc/archives/39509387.html, Jun. 23, 2014, 5 Pages.

* cited by examiner

*Primary Examiner* — Pinel E Romain
(74) *Attorney, Agent, or Firm* — Oblon, McClelland, Maier & Neustadt, L.L.P.

(57) ABSTRACT

A vehicle lower portion structure includes: a floor panel having a floor tunnel provided along a vehicle longitudinal direction, the floor tunnel being provided at a middle portion of the floor panel in a vehicle width direction including a side wall, and being open to a vehicle lower side; a pair of sub-tunnels, the sub-tunnels being disposed on respective sides of the floor tunnel in the vehicle width direction, each of the sub-tunnels extending in the vehicle longitudinal direction on outer sides of the floor tunnel in the vehicle width direction, and being joined to the side wall; and a reinforcing member coupling to respective sides of the floor panel, the respective sides of the floor panel sandwiching a middle portion of the floor tunnel in the vehicle width direction.

9 Claims, 7 Drawing Sheets

VEHICLE LOWER PORTION STRUCTURE

INCORPORATION BY REFERENCE

The disclosure of Japanese Patent Application No 2015-165677 filed on Aug. 25, 2015 including the specification, drawings and abstract is incorporated herein by reference in its entirety.

BACKGROUND OF THE INVENTION

1. Field of the Invention

The invention relates to a vehicle lower portion structure.

2. Description of Related Art

As a vehicle lower portion structure including a floor tunnel formed by bulging a floor panel toward a vehicle upper side, Japanese Patent Application Publication No. 2007-269052 (JP 2007-269052 A) discloses a structure in which seat reinforcing members (sub-tunnels) are disposed to extend along the floor tunnel in a vehicle longitudinal direction. The seat reinforcing members are respectively disposed on both sides in a vehicle width direction of the floor tunnel and joined to side walls of the floor tunnel, thereby reinforcing the floor tunnel.

SUMMARY OF THE INVENTION

However, the technique disclosed in JP 2007-269052 A does not take into account suppressing the deformation of the floor tunnel at the time of a collision such as an offset collision of a vehicle. That is, at the time of the collision such as the offset collision of the vehicle, a collision load is input on one side in the vehicle width direction with respect to the floor tunnel, while an inertial force is exerted in a travel direction on the other side in the vehicle width direction with respect to the floor tunnel. Therefore, stresses in opposite directions act on the respective sides sandwiching the floor tunnel therebetween in the vehicle width direction. In order to suppress the deformation of the floor tunnel in such a case, there is still room for improvement.

The disclosure provides a vehicle lower portion structure that is capable of suppressing the deformation of a floor tunnel at the time of a collision such as an offset collision of a vehicle.

A vehicle lower portion structure according to a first aspect of the disclosure includes a floor panel having a floor tunnel provided along a vehicle longitudinal direction, the floor tunnel being provided at a middle portion of the floor panel in a vehicle width direction, and the floor tunnel including a side wall and being open to a vehicle lower side; a pair of sub-tunnels, the sub-tunnels being disposed on respective sides of the floor tunnel in the vehicle width direction, each of the sub-tunnels extending in the vehicle longitudinal direction on outer sides of the floor tunnel in the vehicle width direction, and being joined to the side wall; and a reinforcing member coupling to respective sides of the floor panel, the respective sides of the floor panel sandwiching a middle portion of the floor tunnel in the vehicle width direction.

In the first aspect, the reinforcing member may be disposed inside the floor tunnel and couple a first part of an inner surface of the side wall and a second part of the inner surface of the side wall. The first part and the second part may face to inside of the floor tunnel and be opposed to each other.

In the first aspect, the reinforcing member may be disposed at a position where at least a part of the reinforcing member overlaps the sub-tunnels in a vehicle side view.

In the vehicle lower portion structure according to the first aspect, the pair of sub-tunnels are disposed on respective sides of the floor tunnel in the vehicle width direction. Further, each of the sub-tunnels extends in the vehicle longitudinal direction on the outer sides of the side walls of the floor tunnel in the vehicle width direction, and is joined to the side wall of the floor tunnel. By providing such sub-tunnels, the rigidity and strength of the floor tunnel is enhanced.

Further, the reinforcing member is disposed inside the floor tunnel and the inner surfaces of the side walls of the floor tunnel opposed to each other are coupled to each other via the reinforcing member. Herein, the reinforcing member may be disposed at a position where at least part of the reinforcing member overlaps the sub-tunnels in a vehicle side view. With this configuration, the rigidity and strength of the floor tunnel can be enhanced so that even if stresses in opposite directions act on respective sides sandwiching the floor tunnel in the vehicle width direction at the time of a collision such as an offset collision of a vehicle, the deformation of the floor tunnel can be suppressed. Incidentally, "offset collision" referred to herein may be a small overlap collision, an oblique collision, or the like.

In the first aspect, the reinforcing member may be disposed at a position coupling front end portions of the pair of sub-tunnels to each other via the side wall and a position coupling rear end portions of the pair of sub-tunnels to each other via the side wall.

In the vehicle lower portion structure according to the above-described aspect, the reinforcing members are respectively disposed at the positions corresponding to the front end portions and the rear end portions of the sub-tunnels where the loads exerted on the floor tunnel from the sub-tunnel on the collision side become maximum. In this way, by disposing the reinforcing members at the portions where the floor tunnel is most easily deformed, the deformation of the floor tunnel can be suppressed compared to a configuration in which the reinforcing members are disposed at other positions. Further, the collision load and so on can be effectively transmitted from the collision side to the anti-collision side.

In the first aspect, a shaft may extend in the vehicle longitudinal direction inside the floor tunnel, and the reinforcing member may have a support portion supporting the shaft from the vehicle lower side.

In the vehicle lower portion structure according to the above-described aspect, it is possible to support the shaft using the reinforcing member that is disposed for enhancing the rigidity and strength of the floor tunnel. With this configuration, it is not necessary to separately prepare dedicated components for supporting the shaft or it is possible to reduce the number of dedicated components for supporting the shaft.

In the first aspect, the reinforcing member may include: a pair of vertical wall portions disposed with an interval between the vertical wall portions in the vehicle longitudinal direction and each of the vertical wall portions extending in a vehicle vertical direction in a vehicle side view; and a bottom wall portion connecting between lower end portions of the vertical wall portions. A closed space may be formed by the vertical wall portions, the bottom wall portion, and the floor tunnel.

In the vehicle lower portion structure according to the above-described aspect, the closed space is formed by the reinforcing member and the floor tunnel. With this configuration, the rigidity and strength of the floor tunnel can be enhanced compared to, for example, a configuration in which a reinforcing member of a flat plate shape is used or a configuration in which an open space is formed between the reinforcing member and the floor tunnel.

In the first aspect, the side wall may include a first side wall and a second side wall facing each other in the vehicle width direction, and the floor tunnel may include an upper wall connecting between a vehicle upper end portion of the first side wall and a vehicle upper end portion of the second side wall.

The first aspect may include: a pair of rockers provided on outer sides of respective ends of the floor panel in the vehicle width direction, the rockers each extending in the vehicle longitudinal direction; a pair of sub-rockers, one of the sub-rockers being provided on an inner side of one of the rockers in the vehicle width direction and connected to the one of the rockers, and the other one of the sub-rockers being provided on an inner side of the other one of the pair of rockers in the vehicle width direction and connected to the other one of the rockers; and a pair of floor cross members provided along the vehicle width direction and one of the floor cross members being connected to the one of the sub-rockers and to one of the sub-tunnels, and the other one of the floor cross members being connected to the other one of the sub-rockers and to the other one of the sub-tunnels, and the floor cross members sandwiching the floor tunnel in the vehicle width direction.

A second aspect of the disclosure includes: a floor panel having a floor tunnel, the floor tunnel being open to a vehicle lower side; a pair of sub-tunnels provided on outer sides of the floor tunnel, the sub-tunnels sandwiching the floor tunnel in a direction perpendicular to an extending direction of the floor tunnel, and the sub-tunnels being connected to the floor tunnel; and a reinforcing member connecting respective sides of the floor panel in the direction perpendicular to the extending direction of the floor tunnel, the respective sides of the floor panel sandwiching a middle portion of the floor tunnel in the direction perpendicular to the extending direction of the floor tunnel.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinbelow, referring to FIGS. 1 to 4, a vehicle lower portion structure according to a first embodiment of the invention will be described. Arrow FR, arrow UP, and arrow OUT shown in the figures as appropriate indicate a vehicle front side, a vehicle upper side, and an outer side in a vehicle width direction (hereinafter, also referred to as a vehicle width direction outer side), respectively. In the following description, when a direction of front or rear, a direction of up or down, or a direction of left or right is used without any special mention, it indicates front or rear in a vehicle longitudinal direction, up or down in a vehicle vertical direction, or left or right when facing in a travel direction.

Figure 1:
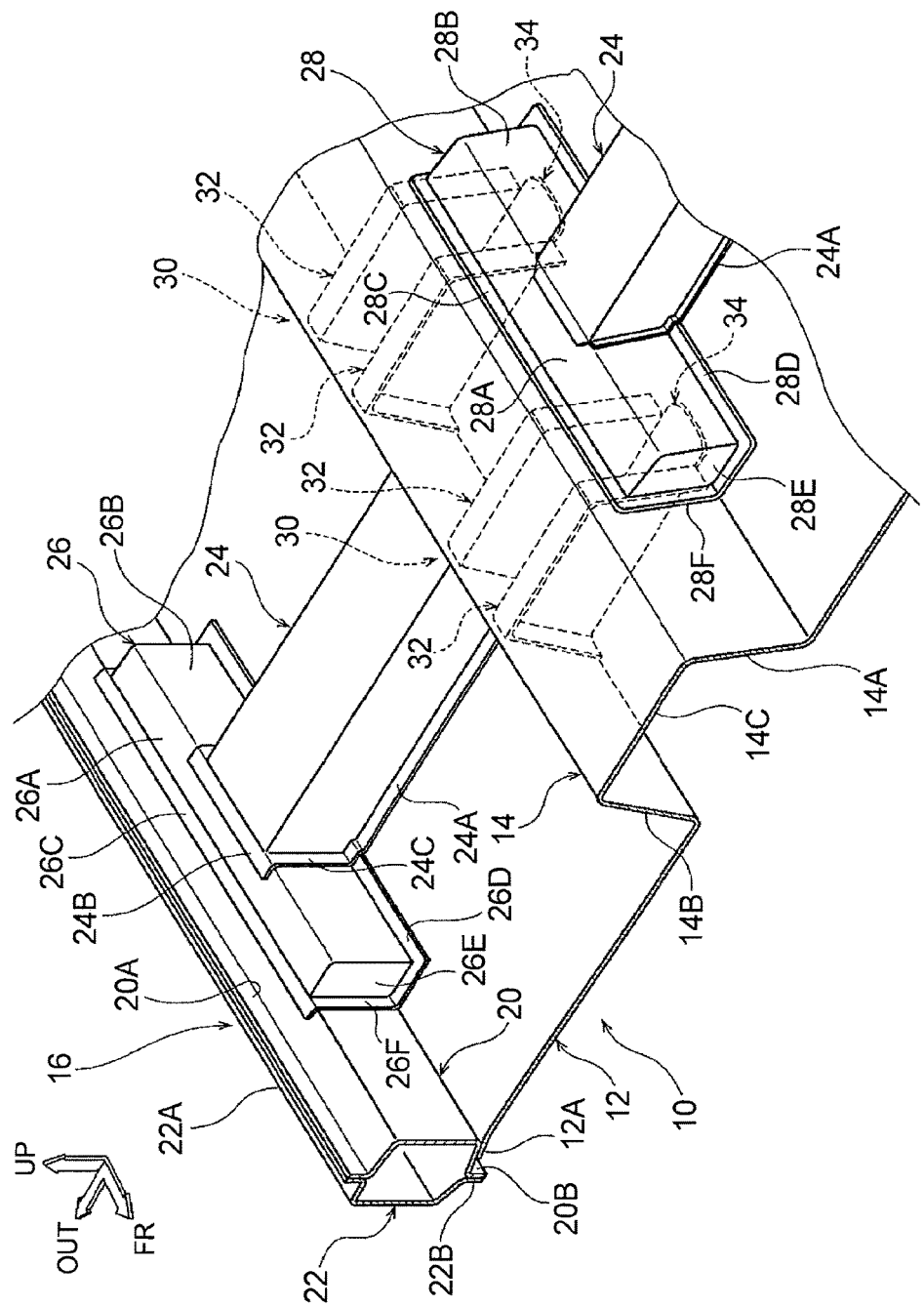
FIG. 1 is a schematic perspective view in which a vehicle lower portion structure according to a first embodiment is seen from a vehicle upper side.
Figure 2:
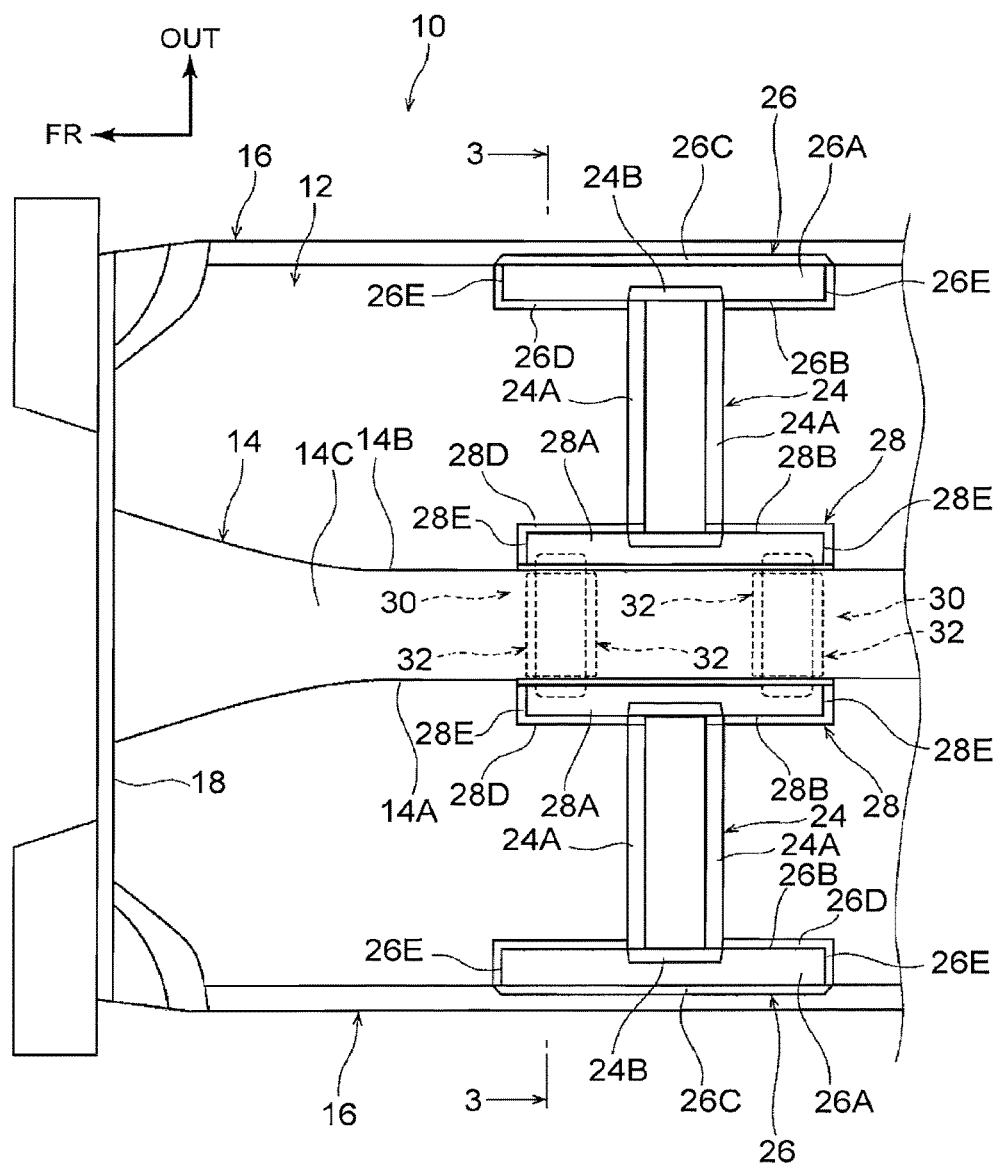
FIG. 2 is a plan view showing the vehicle lower portion structure according to the first embodiment.
Figure 3:
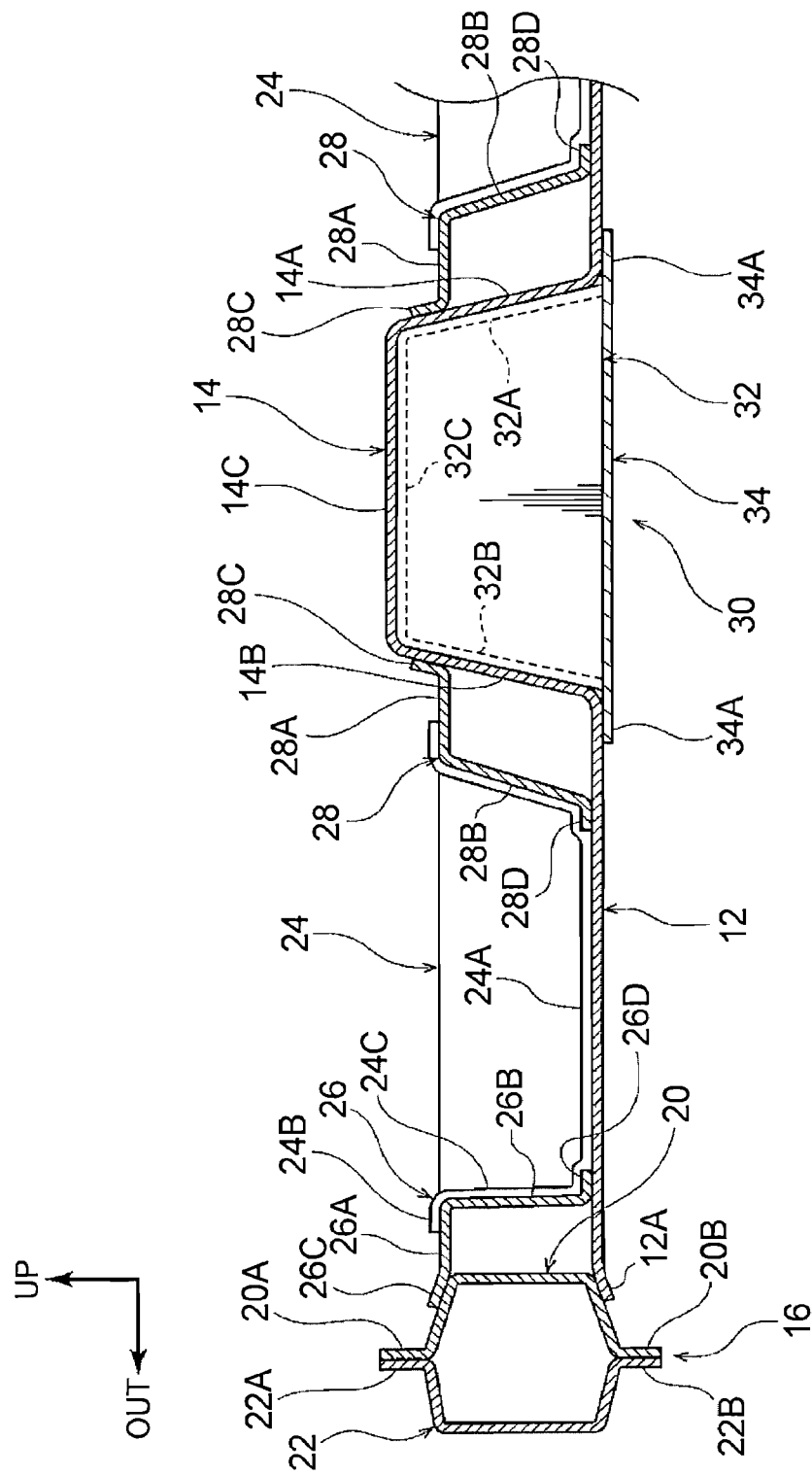
FIG. 3 is an enlarged cross-sectional view showing on an enlarged scale a state taken along line 3-3 of FIG. 2.

The overall configuration of the vehicle lower portion structure will be described. As shown in FIGS. 1 to 3, a floor panel 12 forming a floor portion of a vehicle compartment is disposed in a vehicle lower portion 10 of a vehicle to which the vehicle lower portion structure of this embodiment is applied. The floor panel 12 forms a bottom surface of the vehicle and is made of a plate member of a generally rectangular shape in a vehicle plan view. A floor tunnel 14 formed by bulging the floor panel 12 toward the vehicle upper side is provided at a middle portion of the floor panel 12 in the vehicle width direction. Further, end portions 12A on the outer sides of the floor panel 12 in the vehicle width direction are joined to rockers 16 which will be described later. While part of the vehicle left side is not shown in the vehicle lower portion 10 shown in FIGS. 1 and 3, the vehicle left side and the vehicle right side are formed substantially symmetrical with each other, sandwiching the floor tunnel 14 therebetween.

The floor tunnel 14 extends along the vehicle longitudinal direction and its cross section taken vertically along the vehicle width direction has a generally U-shape that is open to the vehicle lower side. The floor tunnel 14 includes a left side wall 14A on the vehicle left side, a right side wall 14B on the vehicle right side, and an upper wall 14C connecting between upper end portions of the left side wall 14A and the right side wall 14B. Further, as shown in FIG. 2, a front end portion of the floor tunnel 14 is formed to be wider than its general portion and is joined to a dash panel 18. A rear end portion of the floor tunnel 14 extends to a rear end portion of the floor panel 12 and is joined to a rear cross member (not shown) extending in the vehicle width direction.

A pair of left and right rockers 16 are respectively disposed on the outer sides of the floor panel 12 in the vehicle width direction. Hereinbelow, the rocker 16 on the vehicle right side will be described with reference to FIGS. 1 and 3. The rocker 16 on the vehicle left side also has the same configuration.

The rocker 16 extends in the vehicle longitudinal direction. The rocker 16 includes a rocker inner panel 20 disposed at a portion of the rocker 16 on the vehicle width direction inner side and a rocker outer panel 22 disposed at a portion on the vehicle width direction outer side of the rocker 16, thereby forming a closed cross-sectional structure.

A cross section, taken vertically along the vehicle width direction, of the rocker inner panel 20 has a generally hat shape that is open to the outer side in the vehicle width direction. The rocker inner panel 20 has an inner-side upper flange portion 20A extending toward the vehicle upper side from an upper portion of the rocker inner panel 20. The rocker inner panel 20 has an inner-side lower flange portion 20B extending toward the vehicle lower side from a lower portion of the rocker inner panel 20.

The rocker outer panel 22 is disposed to face the rocker inner panel 20 in the vehicle width direction and its cross section taken vertically along the vehicle width direction has a generally hat shape that is open to the inner side in the vehicle width direction. The rocker outer panel 22 has an outer-side upper flange portion 22A extending toward the vehicle upper side from an upper portion of the rocker outer panel 22. The rocker outer panel 22 has an outer-side lower flange portion 22B extending toward the vehicle lower side from a lower portion of the rocker outer panel 22. A rocker reinforcement and so on may be disposed in the closed cross section of the rocker 16.

As shown in FIG. 2, a sub-rocker 26 is disposed on the vehicle width direction inner side of each of the rockers 16. The sub-rockers 26 are respectively disposed on the left and right sandwiching the floor tunnel 14 therebetween and each extends in the vehicle longitudinal direction along the corresponding rocker 16. Hereinbelow, the sub-rocker 26 on the vehicle right side will be described with reference to FIGS. 1 and 3. The sub-rocker 26 on the vehicle left side also has the same configuration.

As shown in FIG. 1, the sub-rocker 26 is formed in a generally rectangular shape elongated in the vehicle longitudinal direction in a vehicle plan view. As shown in FIG. 3, the sub-rocker 26 includes an upper wall portion 26A extending toward the vehicle width direction inner side from an upper portion of the rocker inner panel 20 and a vertical wall portion 26B extending toward the vehicle lower side from an end portion on the vehicle width direction inner side of the upper wall portion 26A. Further, an upper flange portion 26C extends along an upper portion of the rocker inner panel 20 from an end portion on the vehicle width direction outer side of the upper wall portion 26A and is joined to the rocker inner panel 20. Brackets (not shown) are respectively attached to both end portions in the vehicle longitudinal direction of the upper wall portion 26A and seat rails for supporting a vehicle seat are attached to the upper wall portion 26A via the brackets. Alternatively, the seat rails may be attached directly to the upper wall portion 26A not via the brackets.

A side wall portion 26E is provided at a front end portion of the sub-rocker 26. The side wall portion 26E is connected to the upper wall portion 26A and the vertical wall portion 26B with its thickness direction parallel to the vehicle longitudinal direction and is formed in a generally rectangular shape in a vehicle front view.

A lower flange portion 26D extends along the floor panel 12 from lower end portions of the vertical wall portion 26B and the side wall portion 26E. The lower flange portion 26D is joined to an upper surface of the floor panel 12. Consequently, a closed cross section is formed by the sub-rocker 26, the floor panel 12, and the rocker inner panel 20 (see FIG. 3).

A lateral flange portion 26F extends toward the vehicle front side along the rocker inner panel 20 at an end portion on the vehicle width direction outer side of the side wall portion 26E and is joined to the rocker inner panel 20. It is to be noted that a side wall portion 26E which is the same as the side wall portion 26E provided at the front end portion of the sub-rocker 26 is provided at a rear end portion of the sub-rocker 26 (see FIG. 2).

As shown in FIG. 2, a floor cross member 24 is disposed on the inner side of each of the sub-rockers 26 in the vehicle width direction. The floor cross members 24 are respectively disposed on the left and right sandwiching the floor tunnel 14 therebetween and each extend in the vehicle width direction. Hereinbelow, the floor cross member 24 on the vehicle right side will be described with reference to FIG. 1. The floor cross member 24 on the vehicle left side also has the same configuration.

As shown in FIG. 1, a cross section, taken vertically along the vehicle longitudinal direction, of the floor cross member 24 has a generally hat shape that is open to the vehicle lower side, and an end portion on the outer side of the floor cross member 24 in the vehicle width direction is joined to a middle portion of the sub-rocker 26 in the vehicle longitudinal direction.

Lower flange portions 24A respectively extend toward the vehicle front side and the vehicle rear side from lower end portions of the floor cross member 24 and are joined to the upper surface of the floor panel 12. End portions on the vehicle width direction outer side of the lower flange portions 24A overlap an upper surface of the lower flange portion 26D of the sub-rocker 26 and are joined to the upper surface of the floor panel 12 via the lower flange portion 26D. On the other hand, end portions on the vehicle width direction inner side of the lower flange portions 24A overlap an upper surface of a lower flange portion 28D of a sub-tunnel 28, which will be described later, and are joined to the upper surface of the floor panel 12 via the lower flange portion 28D (see the floor cross member 24 on the vehicle left side in FIG. 1).

Further, an upper flange portion 24B and lateral flange portions 24C respectively extend along the upper wall portion 26A and the vertical wall portion 26B of the sub-rocker 26 from end portions on the vehicle width direction outer side of the floor cross member 24. The upper flange portion 24B overlaps the upper wall portion 26A of the sub-rocker 26 and is joined to the upper wall portion 26A. The lateral flange portions 24C overlap the vertical wall portion 26B of the sub-rocker 26 and are joined to the vertical wall portion 26B.

As shown in FIG. 2, end portions on the vehicle width direction inner sides of the floor cross members 24 are joined to the floor tunnel 14 via the sub-tunnels 28, respectively. Herein, the sub-tunnels 28 are respectively disposed on the vehicle width direction outer sides of the floor tunnel 14 and each extend in the vehicle longitudinal direction. The sub-tunnels 28 are each formed in a generally rectangular shape elongated in the vehicle longitudinal direction in a vehicle plan view. Hereinbelow, the sub-tunnel 28 on the vehicle left side will be described with reference to FIG. 1. The sub-tunnel 28 on the vehicle right side also has the same configuration.

As shown in FIG. 1, the sub-tunnel 28 on the vehicle left side is joined to the left side wall 14A of the floor tunnel 14. The sub-tunnel 28 includes an upper wall portion 28A extending toward the outer side in the vehicle width direction from an upper portion of the left side wall 14A and a vertical wall portion 28B extending toward the vehicle lower side from an end portion of the upper wall portion 28A on the vehicle width direction outer side. Further, an upper flange portion 28C extends toward the vehicle upper side along the left side wall 14A from an end portion on the inner side of the upper wall portion 28A in the vehicle width direction and is joined to the left side wall 14A. Brackets (not shown) are respectively attached to both end portions of the upper wall portion 28A in the vehicle longitudinal direction and seat rails for supporting a vehicle seat are attached to the upper wall portion 28A via the brackets.

Alternatively, the seat rails may be attached directly to the upper wall portion 28A not via the brackets.

A side wall portion 28E is provided at a front end portion of the sub-tunnel 28. The side wall portion 28E is connected to the upper wall portion 28A and the vertical wall portion 28B with its thickness direction parallel to the vehicle longitudinal direction and is formed in a generally rectangular shape in a vehicle front view.

A lower flange portion 28D extends along the floor panel 12 from lower end portions of the vertical wall portion 28B and the side wall portion 28E and is joined to the upper surface of the floor panel 12. Consequently, a closed cross section is formed by the sub-tunnel 28, the floor panel 12, and the left side wall 14A (see FIG. 3).

A lateral flange portion 28F extends toward the vehicle front side along the left side wall 14A at an end portion on the vehicle width direction inner side of the side wall portion 28E and is joined to the left side wall 14A. As shown in FIG. 2, a side wall portion 28E which is the same as the side wall portion 28E provided at the front end portion of the sub-tunnel 28 is provided at a rear end portion of the sub-tunnel 28. The sub-tunnel 28 on the vehicle right side is joined to the right side wall 14B of the floor tunnel 14.

Herein, as shown in FIGS. 1 and 2, tunnel cross members 30 as reinforcing members are disposed inside the floor tunnel 14. Hereinbelow, details of the tunnel cross members 30 will be described.

As shown in FIG. 2, the tunnel cross members 30 are respectively disposed between front end portions of the sub-tunnels 28 disposed on the left and right and between rear end portions of the sub-tunnels 28 disposed on the left and right. That is, the tunnel cross members 30 are respectively disposed at a position coupling the front end portions of the sub-tunnels 28 to each other via the left side wall 14A and the right side wall 14B of the floor tunnel 14 and at a position coupling the rear end portions of the sub-tunnels 28 to each other via the left side wall 14A and the right side wall 14B. Therefore, the tunnel cross members 30 are each disposed at a position where at least part thereof overlaps the sub-tunnels 28 in a vehicle side view (in this embodiment, each tunnel cross member 30 is disposed at a position where its whole overlaps the sub-tunnels 28 in a vehicle side view).

Figure 4:
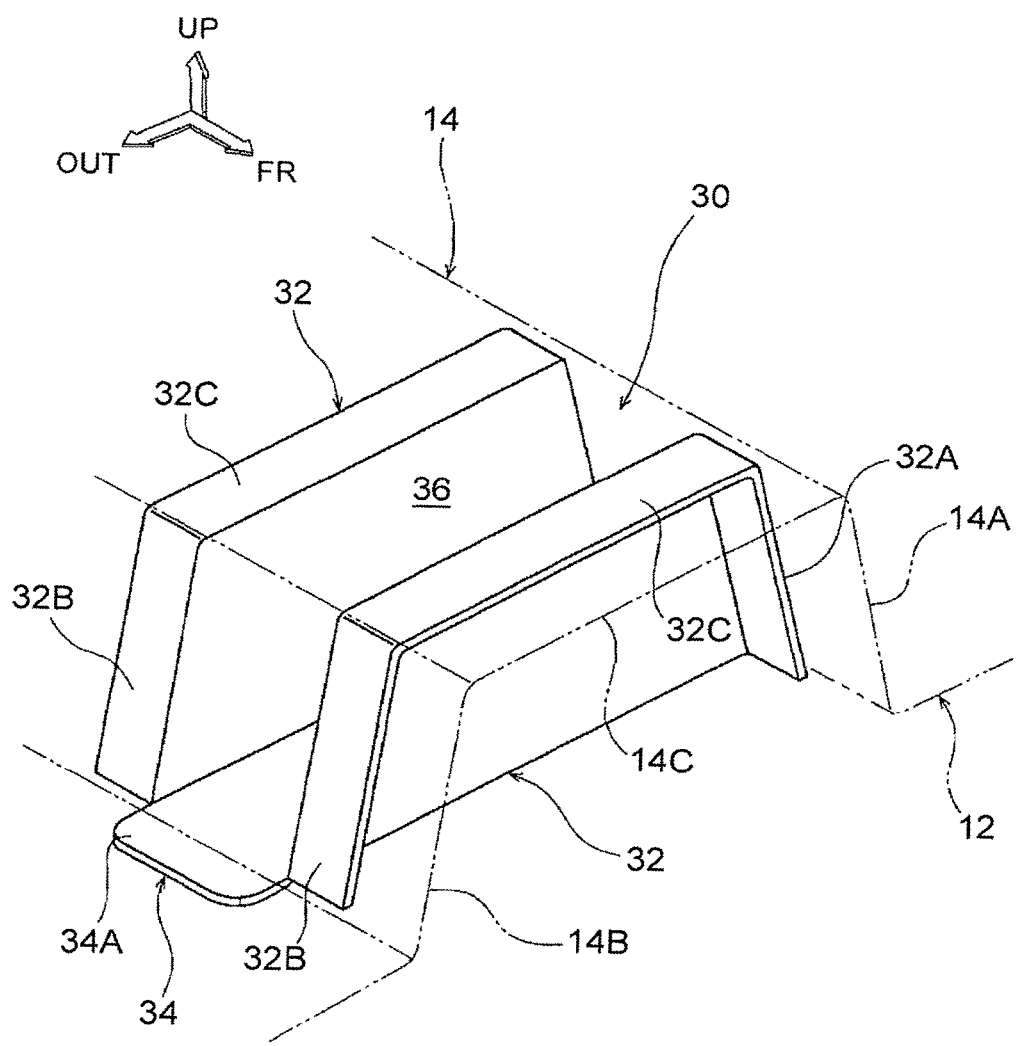
FIG. 4 is an enlarged perspective view showing on an enlarged scale a tunnel cross member according to the first embodiment.

As shown in FIG. 4, the tunnel cross member 30 includes a pair of vertical wall portions 32 disposed with an interval therebetween in the vehicle longitudinal direction and a bottom wall portion 34 connecting between lower end portions of the vertical wall portions 32.

The vertical wall portions 32 each extend in the vehicle vertical direction in a vehicle side view with its thickness direction parallel to the vehicle longitudinal direction. Each vertical wall portion 32 is formed in a generally trapezoidal shape in a vehicle front view so as to correspond to the floor tunnel 14.

Herein, a left flange portion 32A extends along the left side wall 14A of the floor tunnel 14 from an end portion of each vertical wall portion 32 on the vehicle left side. The left flange portions 32A extend in directions away from each other. That is, the left flange portion 32A of the vertical wall portion 32 on the vehicle front side extends toward the vehicle front side, while the left flange portion 32A of the vertical wall portion 32 on the vehicle rear side extends toward the vehicle rear side. The left flange portions 32A are joined to the left side wall 14A.

On the other hand, a right flange portion 32B extends along the right side wall 14B of the floor tunnel 14 from an end portion of each vertical wall portion 32 on the vehicle right side. The right flange portions 32B each extend in the same direction as the corresponding left flange portion 32A and are joined to the right side wall 14B.

An upper flange portion 32C extends along the upper wall 14C of the floor tunnel 14 from an upper portion of each vertical wall portion 32. The upper flange portions 32C each extend in the vehicle width direction to connect between the left flange portion 32A and the right flange portion 32B and are joined to the upper wall 14C of the floor tunnel 14.

The bottom wall portion 34 is formed in a generally rectangular shape elongated in the vehicle width direction in a vehicle plan view with its thickness direction parallel to the vehicle vertical direction. The bottom wall portion 34 is formed to be longer in the vehicle width direction than the vertical wall portions 32, and both end portions of the bottom wall portion 34 in the vehicle width direction are each formed as an extension portion 34A extending more to the outer side in the vehicle width direction than the vertical wall portions 32. The extension portions 34A overlap a lower surface of the floor panel 12 and are joined to the floor panel 12.

Since the tunnel cross member 30 is configured as described above, a cross section, taken vertically along the vehicle longitudinal direction, of the tunnel cross member 30 has a generally hat shape that is open to the vehicle upper side. Since the left flange portions 32A, the right flange portions 32B, and the upper flange portions 32C of the pair of vertical wall portions 32 are respectively joined to the inner surfaces of the floor tunnel 14, a closed cross section 36 is formed by the tunnel cross member 30 and the floor tunnel 14.

Next, the effects of the vehicle lower portion structure of this embodiment will be described.

In this embodiment, the pair of sub-tunnels 28 are respectively disposed on both sides of the floor tunnel 14 in the vehicle width direction and the tunnel cross members 30 are disposed inside the floor tunnel 14. The tunnel cross members 30 are each disposed at a position where at least part thereof overlaps the sub-tunnels 28 in a vehicle side view. With this configuration, the pair of sub-tunnels 28 are coupled to each other in the vehicle width direction via the tunnel cross members 30 so that the rigidity and strength of the floor tunnel 14 can be enhanced. As a result, the deformation of the floor tunnel 14 can be suppressed at the time of a collision such as an offset collision of the vehicle. That is, at the time of the collision such as the offset collision of the vehicle, a collision load is input on one side in the vehicle width direction with respect to the floor tunnel 14, while an inertial force is exerted in a travel direction on the other side in the vehicle width direction with respect to the floor tunnel 14. Therefore, stresses in opposite directions act on the respective sides sandwiching the floor tunnel 14 therebetween in the vehicle width direction. Even in such a case, since the rigidity and strength of the floor tunnel 14 are enhanced by the sub-tunnels 28 and the tunnel cross members 30 as described above, the deformation of the floor tunnel 14 can be suppressed.

In this embodiment, the tunnel cross members 30 are respectively disposed at the positions corresponding to the front end portions and the rear end portions of the sub-tunnels 28 where the loads exerted on the floor tunnel 14 from the sub-tunnels 28 become maximum. In this way, by disposing the tunnel cross members 30 at the portions where the floor tunnel 14 is most easily deformed, the deformation of the floor tunnel 14 can be suppressed compared to a configuration in which the tunnel cross members 30 are disposed at other positions. In particular, as shown in FIG. 2, since the reinforcing structure of a generally rectangular shape in a vehicle plan view is formed by the pair of sub-tunnels 28 and the pair of tunnel cross members 30, the rigidity and strength of the floor tunnel 14 can be enhanced. Further, the collision load and so on can be effectively transmitted from the collision side to the anti-collision side.

In this embodiment, as shown in FIG. 4, the closed space 36 is formed by the tunnel cross member 30 and the floor tunnel 14. With this configuration, the rigidity and strength of the floor tunnel 14 can be enhanced compared to a configuration in which a reinforcing member of a flat plate shape is disposed inside the floor tunnel 14 or a configuration in which an open cross section is formed by the tunnel cross member 30 and the floor tunnel 14.

In this embodiment, since it is configured that the sub-tunnels 28 for supporting vehicle seats (not shown) are coupled to each other via the tunnel cross members 30 to thereby enhance the rigidity and strength of the floor tunnel 14, it is not necessary to separately provide a reinforcing member such as a tunnel reinforcement.

In this embodiment, each rocker 16 and the floor tunnel 14 are coupled to each other in the vehicle width direction via the sub-rocker 26, the floor cross member 24, and the sub-tunnel 28, and the pair of sub-rockers 26 are coupled to each other in the vehicle width direction via the tunnel cross members 30. With this configuration, for example, the load input to the rocker 16 on the collision side at the time of a collision such as a side collision of the vehicle can be transmitted to the anti-collision side via the sub-rocker 26, the floor cross member 24, the sub-tunnel 28, and the tunnel cross members 30.

A modification of the first embodiment will be described. In the first embodiment, it is configured that the whole of the tunnel cross member 30 overlaps the sub-tunnels 28 in a vehicle side view. However, the embodiment is not limited thereto. The same effect is obtained with a configuration in which at least part of the tunnel cross member 30 overlaps the sub-tunnels 28 in a vehicle side view. In this regard, a vehicle lower portion structure shown in FIG. 5 may be employed. Alternatively, even if the tunnel cross member 30 is disposed at a position that does not overlap the sub-tunnels 28 in a vehicle side view, the tunnel cross member 30 can serve as an auxiliary to aid the floor tunnel 14 to transmit the load from the collision side to the anti-collision side.

Figure 5:
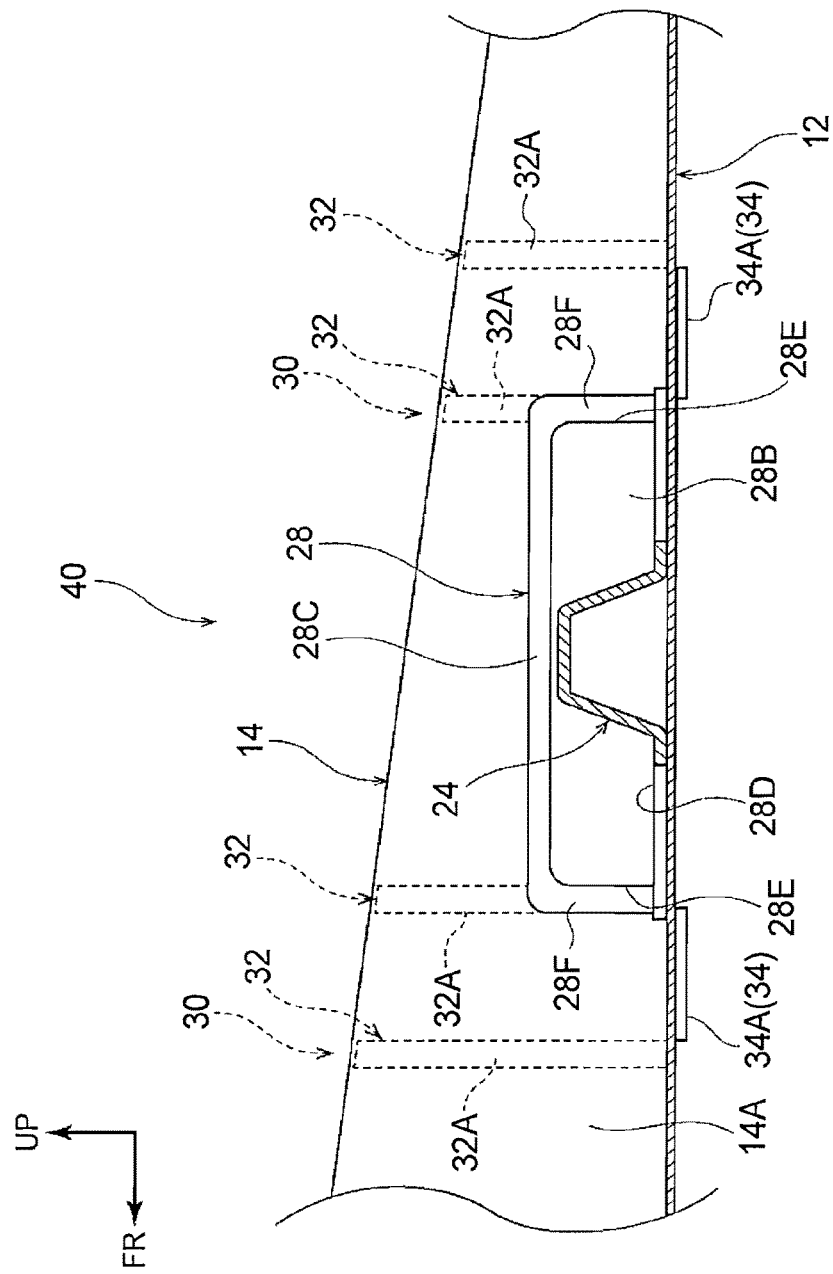
FIG. 5 is a side sectional view showing a modification of the vehicle lower portion structure according to the first embodiment, wherein a floor tunnel is seen from a vehicle width direction.

As shown in FIG. 5, in a vehicle lower portion 40 of a vehicle in which the vehicle lower portion structure according to this modification is employed, a tunnel cross member 30 on the vehicle front side is disposed more on the vehicle front side than in the configuration of FIG. 1. A left flange portion 32A of a vertical wall portion 32 on the vehicle rear side of the tunnel cross member 30 is disposed at a position that overlaps a lateral flange portion 28F of a sub-tunnel 28 in a vehicle side view. That is, the lateral flange portion 28F and the left flange portion 32A are coupled to each other via a floor tunnel 14 interposed therebetween. Although not shown, a right flange portion 32B of the vertical wall portion 32 is coupled to a lateral flange portion 28F of a sub-tunnel 28 on the vehicle right side via the floor tunnel 14 interposed therebetween.

On the other hand, a tunnel cross member 30 on the vehicle rear side is disposed more on the vehicle rear side than in the configuration of FIG. 1. A left flange portion 32A of a vertical wall portion 32 on the vehicle front side of the tunnel cross member 30 is disposed at a position that overlaps a lateral flange portion 28F of the sub-tunnel 28 in a vehicle side view. That is, the lateral flange portion 28F and the left flange portion 32A are coupled to each other via the floor tunnel 14 interposed therebetween. Although not shown, a right flange portion 32B of the vertical wall portion 32 is coupled to a lateral flange portion 28F of the sub-tunnel 28 on the vehicle right side via the floor tunnel 14 interposed therebetween.

Also in the modification described above, the pair of sub-tunnels 28 are coupled to each other in the vehicle width direction via the tunnel cross members 30 so that the rigidity and strength of the floor tunnel 14 can be enhanced. As a result, the deformation of the floor tunnel 14 can be suppressed at the time of a collision such as an offset collision of the vehicle.

Second Embodiment

Next, referring to FIGS. 6 and 7, a vehicle lower portion structure according to a second embodiment of the invention will be described. In this embodiment, the vehicle lower portion structure is applied to a configuration in which a propeller shaft 58 is disposed inside a floor tunnel 14. The same symbols are assigned to configurations that are similar to those of the first embodiment, thereby omitting description thereof as appropriate.

Figure 6:
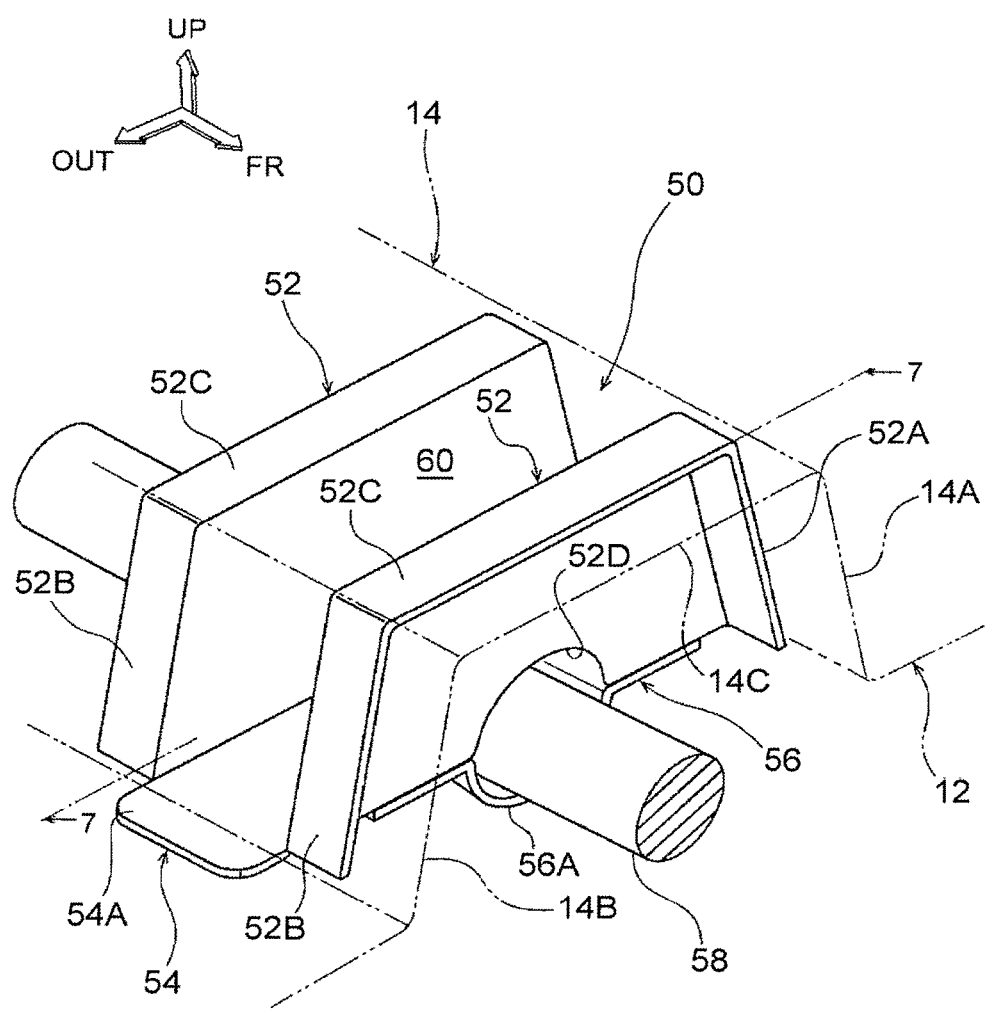
FIG. 6 is an enlarged perspective view showing on an enlarged scale a tunnel cross member forming a vehicle lower portion structure according to a second embodiment.
Figure 7:
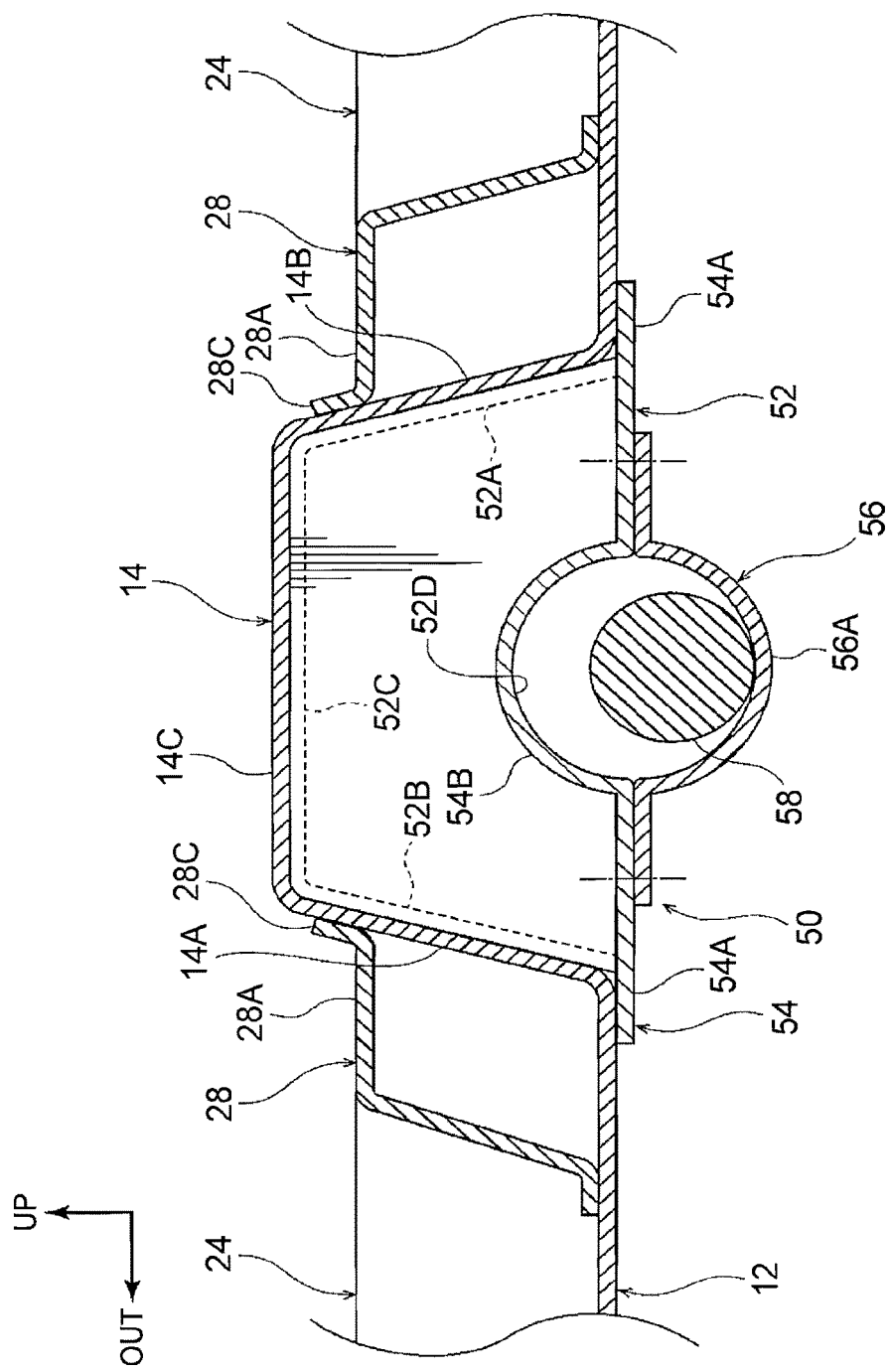
FIG. 7 is an enlarged cross-sectional view showing on an enlarged scale a state taken along line 7-7 of FIG. 6.

As shown in FIG. 6, in the vehicle lower portion structure according to this embodiment, the propeller shaft 58 as a shaft is disposed inside the floor tunnel 14. Therefore, tunnel cross members 50 as reinforcing members in this embodiment are each formed in a shape that avoids the propeller shaft 58. Hereinbelow, details of the tunnel cross member 50 will be described.

The tunnel cross member 50 includes a pair of vertical wall portions 52 disposed with an interval therebetween in the vehicle longitudinal direction, a bottom wall portion 54 connecting between lower end portions of the vertical wall portions 52, and a support bracket 56 as a support portion. The vertical wall portions 52 each extend in the vehicle vertical direction in a vehicle side view with its thickness direction parallel to the vehicle longitudinal direction. Each vertical wall portion 52 is formed in a generally trapezoidal shape in a vehicle front view so as to correspond to the floor tunnel 14. A left flange portion 52A, a right flange portion 52B, and an upper flange portion 52C extend along the floor tunnel 14 from outer peripheral end portions of each vertical wall portion 52.

The left flange portions 52A extend in directions away from each other from the end portions on the vehicle left side of the vertical wall portions 52 and are joined to a left side wall 14A of the floor tunnel 14. The right flange portions 52B extend in directions away from each other from the end portions on the vehicle right side of the vertical wall portions 52 and are joined to a right side wall 14B of the floor tunnel 14. The upper flange portions 52C each extend in the vehicle width direction to connect between the left flange portion 52A and the right flange portion 52B and are joined to an upper wall 14C of the floor tunnel 14.

Herein, a recessed portion 52D recessed toward the vehicle upper side is formed at a middle portion of the lower end portion of each vertical wall portion 52 in the vehicle width direction. As shown in FIG. 7, the recessed portion 52D is formed in a semicircular shape in a vehicle front view so as not to contact the propeller shaft 58.

The bottom wall portion 54 has a thickness direction parallel to the vehicle vertical direction. The bottom wall portion 54 is formed in a generally rectangular shape elongated in the vehicle width direction in a vehicle plan view. The bottom wall portion 54 is formed to be longer in the vehicle width direction than the vertical wall portions 52, and both end portions of the bottom wall portion 54 in the vehicle width direction are each formed as an extension portion 54A extending more to the outer side in the vehicle width direction than the vertical wall portions 52. The extension portions 54A overlap a lower surface of a floor panel 12 and are joined to the floor panel 12. At a middle portion of the bottom wall portion 54 in the vehicle width direction, an upper bulging portion 54B bulging toward the vehicle upper side is formed to correspond to the recessed portions 52D of the vertical wall portions 52.

Herein, the support bracket 56 is attached to the bottom wall portion 54 so that a support portion supporting the propeller shaft 58 from the vehicle lower side is formed by the support bracket 56. The support bracket 56 is formed in a generally rectangular shape elongated in the vehicle width direction in a vehicle plan view with its thickness direction parallel to the vehicle vertical direction. Both end portions of the support bracket 56 in the vehicle width direction overlap a lower surface of the bottom wall portion 54 and are fastened to the bottom wall portion 54 by fasteners such as bolts and nuts (not shown).

Further, a lower bulging portion 56A bulging toward the vehicle lower side is formed at a middle portion of the support bracket 56 in the vehicle width direction. Consequently, a generally hollow cylindrical portion is formed by the lower bulging portion 56A and the upper bulging portion 54B of the bottom wall portion 54. The propeller shaft 58 is supported on the lower bulging portion 56A via bearings (not shown). The tunnel cross member 50 is configured as described above so that a closed area 60 is formed by the tunnel cross member 50 and the floor tunnel 14 as shown in FIG. 6.

Next, the effects of the vehicle lower portion structure of this embodiment will be described.

In this embodiment, the propeller shaft 58 is supported by providing the support bracket 56 to the tunnel cross member 50 that is disposed for enhancing the rigidity and strength of the floor tunnel 14. With this configuration, it is possible to eliminate the need to separately prepare dedicated components for supporting the propeller shaft 58 or to reduce the number of dedicated components for supporting the propeller shaft 58. The other actions and effects are the same as those of the first embodiment.

In this embodiment, the support portion for the propeller shaft 58 is formed by fastening the support bracket 56 to the bottom wall portion 54 of the tunnel cross member 50. However, the embodiment is not limited thereto. For example, it may be configured that through-holes are formed in the vertical wall portions 52 of the tunnel cross member 50 and that the propeller shaft 58 is inserted through the through-holes. In this case, the through-holes serve as support portions for the propeller shaft 58.

While the vehicle lower portion structures according to the first and second embodiments of the invention have been described. The invention can, of course, be carried out in various aspects within a range not departing from the gist thereof. For example, in the above-described embodiments, use is made of the tunnel cross member of the generally hat shape in cross section including the pair of vertical wall portions and the bottom wall portion. However, the invention is not limited thereto. A tunnel cross member may be formed in another shape and, for example, may have a flat plate shape.

In the above-described embodiments, the left flange portions, the right flange portions, and the upper flange portions extending from the outer peripheral end portions of the tunnel cross member are respectively joined to the left side wall 14A, the right side wall 14B, and the upper wall 14C of the floor tunnel 14. However, the invention is not limited thereto. For example, it may be configured that a tunnel cross member that is shorter in the vehicle vertical direction than the height of the floor tunnel 14 is disposed so that a gap is formed between the tunnel cross member and the upper wall 14C of the floor tunnel 14. Even in this case, as long as the tunnel cross member is joined to the left side wall 14A and the right side wall 14B of the floor tunnel 14, the rigidity and strength of the floor tunnel 14 can be enhanced.

In the above-described embodiments, the front end portions of the sub-tunnels 28 are coupled to each other via the tunnel cross member and the rear end portions of the sub-tunnels 28 are coupled to each other via the tunnel cross member. However, the position to dispose the tunnel cross member and the number of the tunnel cross members are not particularly limited. For example, it may be configured that middle portions of the sub-tunnels 28 in the vehicle longitudinal direction are coupled to each other via a single tunnel cross member. Even in this case, the rigidity and strength of the floor tunnel 14 can be enhanced compared to a configuration in which no tunnel cross member is provided. Alternatively, in addition to the tunnel cross members coupling the front end portions of the sub-tunnels 28 to each other and coupling the rear end portions of the sub-tunnels 28 to each other, a third tunnel cross member may be provided. Further, it may be configured that four or more tunnel cross members are provided.

In the above-described embodiments, the floor tunnel and the sub-tunnels are provided to extend in the vehicle longitudinal direction at the middle portion of the floor panel 12 in the vehicle width direction. However, the invention is not limited thereto. For example, a floor tunnel and sub-tunnels may be provided along the vehicle width direction.

What is claimed is:

1. A vehicle lower portion structure comprising:
   a floor panel having a floor tunnel provided along a vehicle longitudinal direction, the floor tunnel being provided at a middle portion of the floor panel in a vehicle width direction, and the floor tunnel including a side wall and being open to a vehicle lower side;
   a pair of sub-tunnels, the sub-tunnels being disposed on respective sides of the floor tunnel in the vehicle width direction, each of the sub-tunnels extending in the vehicle longitudinal direction on outer sides of the floor tunnel in the vehicle width direction, and being joined to the side wall; and
   a reinforcing member coupling to respective sides of the floor panel, the respective sides of the floor panel sandwiching a middle portion of the floor tunnel in the vehicle width direction.

2. The vehicle lower portion structure according to claim 1, wherein
   the reinforcing member is disposed inside the floor tunnel and couples a first part of an inner surface of the side wall and a second part of the inner surface of the side wall, the first part and the second part facing to inside of the floor tunnel and being opposed to each other.

3. The vehicle lower portion structure according to claim 2, wherein
   the reinforcing member is disposed at a position where at least a part of the reinforcing member overlaps the sub-tunnels in a vehicle side view.

4. The vehicle lower portion structure according to claim 2, wherein
   the reinforcing member is disposed at a position coupling front end portions of the pair of sub-tunnels to each other via the side wall and a position coupling rear end portions of the pair of sub-tunnels to each other via the side wall.

5. The vehicle lower portion structure according to claim 2, wherein
a shaft extends in the vehicle longitudinal direction inside the floor tunnel, and the reinforcing member has a support portion supporting the shaft from the vehicle lower side.

6. The vehicle lower portion structure according to claim 1, wherein
the reinforcing member includes:
a pair of vertical wall portions disposed with an interval between the vertical wall portions in the vehicle longitudinal direction and each of the vertical wall portions extending in a vehicle vertical direction in a vehicle side view; and
a bottom wall portion connecting between lower end portions of the vertical wall portions, and
a closed space is formed by the vertical wall portions, the bottom wall portion, and the floor tunnel.

7. The vehicle lower portion structure according to claim 1, wherein
the side wall includes a first side wall and a second side wall facing each other in the vehicle width direction, and
the floor tunnel includes an upper wall connecting between a vehicle upper end portion of the first side wall and a vehicle upper end portion of the second side wall.

8. The vehicle lower portion structure according to claim 1, further comprising:
a pair of rockers provided on outer sides of respective ends of the floor panel in the vehicle width direction, the rockers each extending in the vehicle longitudinal direction;
a pair of sub-rockers, one of the sub-rockers being provided on an inner side of one of the rockers in the vehicle width direction and connected to the one of the rockers, and the other one of the sub-rockers being provided on an inner side of the other one of the pair of rockers in the vehicle width direction and connected to the other one of the rockers; and
a pair of floor cross members provided along the vehicle width direction and one of the floor cross members being connected to the one of the sub-rockers and to one of the sub-tunnels, and the other one of the floor cross members being connected to the other one of the sub-rockers and to the other one of the sub-tunnels, and the floor cross members sandwiching the floor tunnel in the vehicle width direction.

9. A vehicle lower portion structure comprising:
a floor panel having a floor tunnel, the floor tunnel being open to a vehicle lower side;
a pair of sub-tunnels provided on outer sides of the floor tunnel, the sub-tunnels sandwiching the floor tunnel in a direction perpendicular to an extending direction of the floor tunnel, and the sub-tunnels being connected to the floor tunnel; and
a reinforcing member connecting respective sides of the floor panel in the direction perpendicular to the extending direction of the floor tunnel, the respective sides of the floor panel sandwiching a middle portion of the floor tunnel in the direction perpendicular to the extending direction of the floor tunnel.

* * * * *